(12) United States Patent  
Hamilton

(10) Patent No.: US 9,350,805 B2  
(45) Date of Patent: May 24, 2016

(54) ALLOCATION OF CROWDSOURCED RESOURCES

(71) Applicant: Martin Hamilton, Deje (SE)

(72) Inventor: Martin Hamilton, Deje (SE)

(*) Notice: Subject to any disclaimer, the term of this patent is extended or adjusted under 35 U.S.C. 154(b) by 219 days.

(21) Appl. No.: 14/246,101

(22) Filed: Apr. 6, 2014

(65) Prior Publication Data

US 2014/0304339 A1     Oct. 9, 2014

Related U.S. Application Data

(60) Provisional application No. 61/809,890, filed on Apr. 9, 2013.

(51) Int. Cl.
*H04L 29/08*     (2006.01)

(52) U.S. Cl.
CPC ................................ *H04L 67/1078* (2013.01)

(58) Field of Classification Search
None
See application file for complete search history.

(56) References Cited

U.S. PATENT DOCUMENTS

| | | | | |
|---|---|---|---|---|
| 8,719,304 | B2* | 5/2014 | Golze | G06Q 10/10 707/793 |
| 2009/0063252 | A1* | 3/2009 | Abhyanker | G06Q 30/02 705/7.32 |
| 2010/0161369 | A1* | 6/2010 | Farrell | G06Q 50/01 705/319 |
| 2012/0315617 | A1* | 12/2012 | Waitzkin | G09B 7/00 434/365 |
| 2013/0132297 | A1* | 5/2013 | Peter | G06Q 10/067 705/342 |
| 2013/0238649 | A1* | 9/2013 | Shum | G06F 17/30292 707/758 |
| 2014/0129616 | A1* | 5/2014 | Lerios | H04W 4/18 709/203 |
| 2014/0200963 | A1* | 7/2014 | Abhyanker | G06Q 30/0205 705/7.34 |

* cited by examiner

*Primary Examiner* — Kenny Lin
(74) *Attorney, Agent, or Firm* — Bresbo AB

(57) ABSTRACT

A computer-implemented platform may comprise hardware and software configured to allocate crowdsourced resources. An aggregate effort of a plurality of users may be efficiently directed toward a task by allocating resources according to an aggregate distribution of input from the users. The magnitude of the aggregate input of users may be manifest graphically, in a manner that emphasizes information having high priority. A map may include a representation of network comprising a plurality of nodes connected by connections. A node may include a problem and/or a solution, and a connection may describe a relationship between at least two nodes. Aggregate input may be used to revise the map, and analysis of the revised map may yield a resource allocation that directs users toward higher value effort.

21 Claims, 12 Drawing Sheets

ALLOCATION OF CROWDSOURCED RESOURCES

CROSS REFERENCE TO RELATED APPLICATIONS

The present invention claims the priority benefit of U.S. provisional patent application No. 61/809,890, filed Apr. 9, 2013, the disclosure of which is incorporated by reference herein.

BACKGROUND

1. Technical Field

The present invention relates generally to aggregating and displaying information, and more particularly to organizing the efforts of a plurality of users.

2. Description of Related Art

A question or problem is typically posed in an effort to find a solution. Some problems are easy to pose (e.g., "what is the square root of four?" or "do you cast your vote for candidate A or candidate B?"). Some solutions may be provided explicitly and clearly by one person (e.g., "the square root of four is two." or "I vote for candidate A.").

Some problems may appear simple, but are more complicated than initially posed. For example, the problem "what is the square root of four?" might be answered with "are you only interested in the positive root?" Such problems may benefit from dialog among a range of people, some of whom provide input on the problem, some of whom provide input on the solution.

Some problems are difficult to answer (e.g., "why are those countries always fighting?" or "is French wine better than California wine?"). Such problems typically require extensive dialog for long periods of time among many people. Typically this dialog is unstructured, and the problem may remain unanswered, notwithstanding the effort of many people.

Complex problems often require input from many people with diverse ranges of skills. However, without organization of the input and output of the various people addressing a problem, their efforts may not be efficiently utilized. The more complex the problem, the more important is the organization of the efforts of those involved. In some cases (e.g., space flight), the organization of effort may be as important as the effort itself.

Many complex problems require a solution, notwithstanding the difficulties of solving the problem. In such a situation, the problem and its solution may be directed toward achieving a specific goal. For example, during the NASA Apollo 13 lunar mission, a midflight accident jeopardized the safe return of the crew to Earth. In response to this accident, a clear goal (getting the crew back safely) was confounded by a wide range of disparate problems, all of which had to be (and fortunately were) successfully solved. Such complex problems benefit from organization of the efforts of the people involved. In the Apollo 13 mission, the organizational structure of NASA's Mission Control Center provided a critical functionality through which the efforts of those involved could be efficiently utilized.

Complex problems are typically addressed using an organized hierarchy (e.g., a command/control protocol). In such an hierarchy, an organizational structure is imposed upon (and/or adopted by) people working on the problem. For example, building a house may require a team of people working on the foundation, a team working on the framing, a team working on the windows, a team working on the roof, plumbers, electricians, painters, and the like. Such a problem typically requires a global hierarchy having many layers of management. The contractor responsible for building the house may direct the scheduling and efforts of subcontractors responsible for various components of the house, and each subcontractor may have its own manager and workers. For particularly complex problems (launching a satellite, operating a nuclear reactor, waging war), a rigid hierarchy ensures that many foreseeable problems are addressed (i.e., a portion of the hierarchy deals with each particular envisioned problem) and also minimizes redundancy of effort (the responsibility of each person is finite).

A particular challenge arises when a problem requires organization, but an organizational structure is not present a priori. Such problems have previously required the ad-hoc creation of an organizational structure to efficiently utilize resources (e.g., in emergency response). For example, a search party comprising hundreds of people may search for a lost child in the forest. While each member of the search party has some flexibility and freedom with respect to his/her search effort, the success of the search typically requires organization of the integrated effort of the search party, and so an organizational structure may be created to facilitate the response. The level of detail of such organization may vary, but even a small amount of organized information transfer (e.g., "this area has already been searched") can significantly improve the overall efficiency of the search party. In these ad-hoc situations, the creation of organization of effort may be critical to accomplishment of the task. Such tasks benefit from the efforts of a large number of people, typically having a range of interest and competence, having at least some common desire for a solution to a problem. However, without organization, this effort may not be efficiently utilized.

Ad-hoc organization has historically required an assumption of authority or an acquiescence to an authority. Someone may "take control," or the group may elect a leader in an effort to identify an individual or group responsible for the organization structure per se. However, such structures may not scale to the ad-hoc organization of large numbers of people (e.g., hundreds, thousands or millions). Some problems may not lend themselves to prior organizational structures (e.g., determining whether French wine is better than California wine using a command/control organization structure).

Some problems have the interest and/or commitment of many people, but lack the organizational structure to efficiently utilize their efforts. In such cases, the imposition of a "pre-ordained" organizational structure may not be acceptable to the people involved with solving the problem. In such cases, systems and methods to organize the effort of participants (working on a problem) may improve the efficiency of resource utilization and, by extension, the likelihood of solving the problem.

SUMMARY OF THE INVENTION

A platform may comprise hardware and software (e.g., executable instructions stored in a memory) configured to organize the effort of a plurality of devices (e.g., operated by users). Users may be working on a task (e.g., seeking to solve a problem), and organization of their efforts may facilitate a solution to the problem.

A "crowdsourced" problem may include a problem posed to and/or addressed by a plurality of users, many of whom may be tasked with solving the problem (or at least having the problem solved). The problem may be demarcated into a plurality of sub problems. A solution may be demarcated into a plurality of sub-solutions.

Problems, solutions, sub-problems and sub-solutions may be articulated as nodes. A network may comprise nodes connected by connections. A map may represent the network, and may enable interaction among users via input to and from their devices. The network may be configured to adapt to a changing goal associated with the problem. The adaptation of the network may improve the allocation of each user's effort toward solving the problem.

A platform may comprise computing hardware and instructions executable by the hardware to perform a method. A platform may comprise one or more software modules configured to interact with each other (e.g., within an architecture). A computer implemented method may comprise receiving a request for map data from a first device, the map data usable by the first device to generate a map comprising at least two nodes and at least one connection between two nodes. The connection may define a relationship between the nodes. A node may be a problem and/or a solution. A node may be a comment or other type of input (e.g., photo, video, music). Two nodes (either of which may be a problem or solution) may be connected by a connection, which may describe their relationship (e.g., a solution to a problem, a problem which creates another problem, and the like).

The requested map data may be transmitted to the first device. The first device (e.g., the user of the first device) may generate input comprising a vote on a connection and/or a node and a modification request requesting a modification to the map. A vote may indicate agreement/disagreement with the node or connection. A modification request may comprise a request for the creation of a node and/or a connection.

The input may be received from the first device. The map data may be updated pursuant to the received input, and updated map data may be transmitted to a second device. The second device may be the same device as the first device. The second device may be a different device (e.g., the device of another user).

Aggregate user input may be used to update map data. The map may graphically emphasize certain information and/or de-emphasize other information according to user input regarding that information. For example, problems having high priority may be displayed more prominently (e.g., in larger size on the display of the device). A solution that is highly accepted by the users may be displayed as a thick line, whereas a more thinly supported solution may be displayed as a thin line.

Such emphasis on information that has been deemed by users (via their prior input) to be most important may focus subsequent users on higher-priority information. As such, user effort (which may be biased by this emphasis) may be directed toward information having the highest priority.

DETAILED DESCRIPTION OF THE INVENTION

Figure 1:
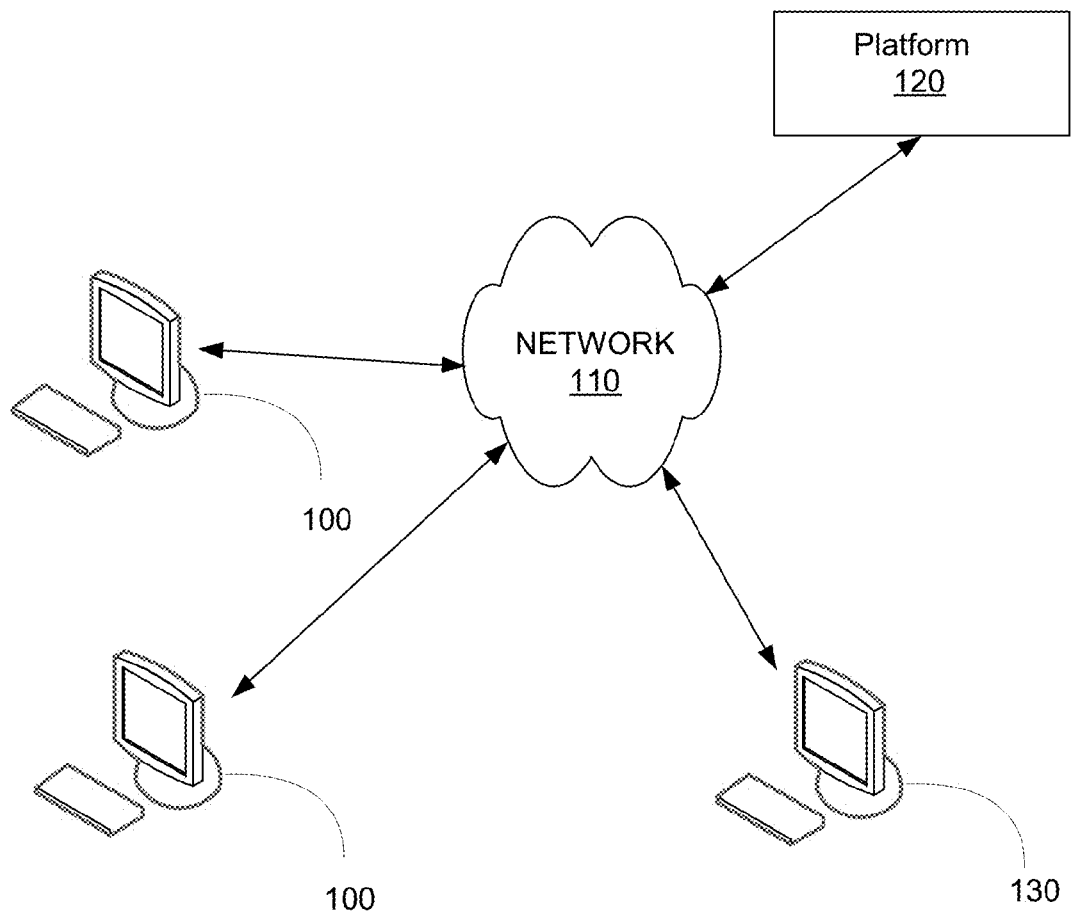
FIG. 1 is a schematic illustration of an exemplary implementation, according to some embodiments.

A computer-implemented platform may comprise hardware and software configured to allocate crowdsourced resources. Crowdsourced resources may include efforts and/or input provided by or associated with a plurality of users (a crowd), including more than 10, 100, 1,000 10,000, 100,000, or even more than 1E6 users. Typically, the users may share a common interest (e.g., a desire to solve a problem). For such large numbers of users, an automated system to receive, process, and organize user input may improve the efficiency with which user effort is utilized.

A map may represent a knowledge-space comprising a plurality of nodes. Nodes may be connected by connections. A node may include a problem and/or a solution. A connection may describe the relationship between the connected nodes. A graphical representation of map data (e.g., the layout of the map) may comprise positions, colors, sizes, and/or other graphical features (including movement and sound, shape, line width, line type, and the like). The map may represent aggregate user input regarding the map, and may emphasize topics (e.g., nodes and/or connections) that the users have identified as being more important than others. This emphasis may change over time, as user input affects the map data (and by extension, the map). By emphasizing topics according to aggregate user input (e.g., the crowd's votes) the map may direct a user's attention toward topics that have been determined to be most important. As a result, a user viewing the map may be directed toward topics most needing that user's attention (as determined by prior aggregate user input). The map may dynamically change over time, reflecting changes in aggregate input, and by extension, changes in emphasis. As a result, effort allocation may respond dynamically to the input of users providing the effort. A crowd may effectively "govern itself" via the incorporation of aggregate input regarding the nodes and connections (e.g., the content of the map) and prioritization of nodes and connections.

Systems and methods may combine "survey" functionality to canvass user opinion with "design" functionality that allows users to influence the content of the survey (e.g., determine "which questions should be asked" of users). The "survey" functionality may receive input (e.g., votes, instructions to share) from users regarding nodes and/or connections already presented. The "design" functionality may offer users the opportunity to create nodes and/or connections. Customizability of the survey functionality may provide for flexibility and adjustability, such that the survey functionality responds to user input regarding the survey (in addition to response to surveyed questions/suggestions). The survey functionality and design functionality may evolve over time, according to user input thereon. As user input varies over time, the map may vary, providing a dynamically changing interface through which users may organize efforts and respond to organization of efforts.

FIG. 1 is a schematic illustration of an exemplary implementation. A plurality of user devices 100 may be in communication via a network 110. Users may interact via a variety of devices, including a computer, a phone, a PDA, a tablet, a gaming interface, an e-book, a television, and the like. A device may display information (e.g., a map) and provide a user interface with which users may interact with a platform 120. Platform 120 may include hardware (e.g., a processor, memory, non-transitory storage, and the like) and software (e.g., instructions stored in the memory and executable by the processor to perform a method). Platform 120 may include a server, such as a web server, an application server, a database server, and the like. Platform 120 may include or provide input for graphical and/or audio output to user devices. Platform 120 may be configured to receive input from the user devices. In some configurations, a user device 100 communicates with platform 120 using a standard internet protocol (IP) over network 110, and may use one or more IP addresses. In some cases, communications may include encrypted information.

Network 110 may include the Internet. Network 110 may be a wide area network (WAN), a local area network (LAN), intranet, extranet, private network or other network, as well as a combination of these networks. Network 110 may include one or more wireless networks, including various 802.11, 802.16, GSM (3G, 4G, 5G and the like), EDGE, and/or CDMA networks.

In some implementations, a moderator may receive and/or provide input that assists users. A moderator may include a user. A moderator may be someone other than a user. In exemplary FIG. 1, a moderator device 130 provides an interface between a moderator and platform 120 via network 110.

Figure 2:
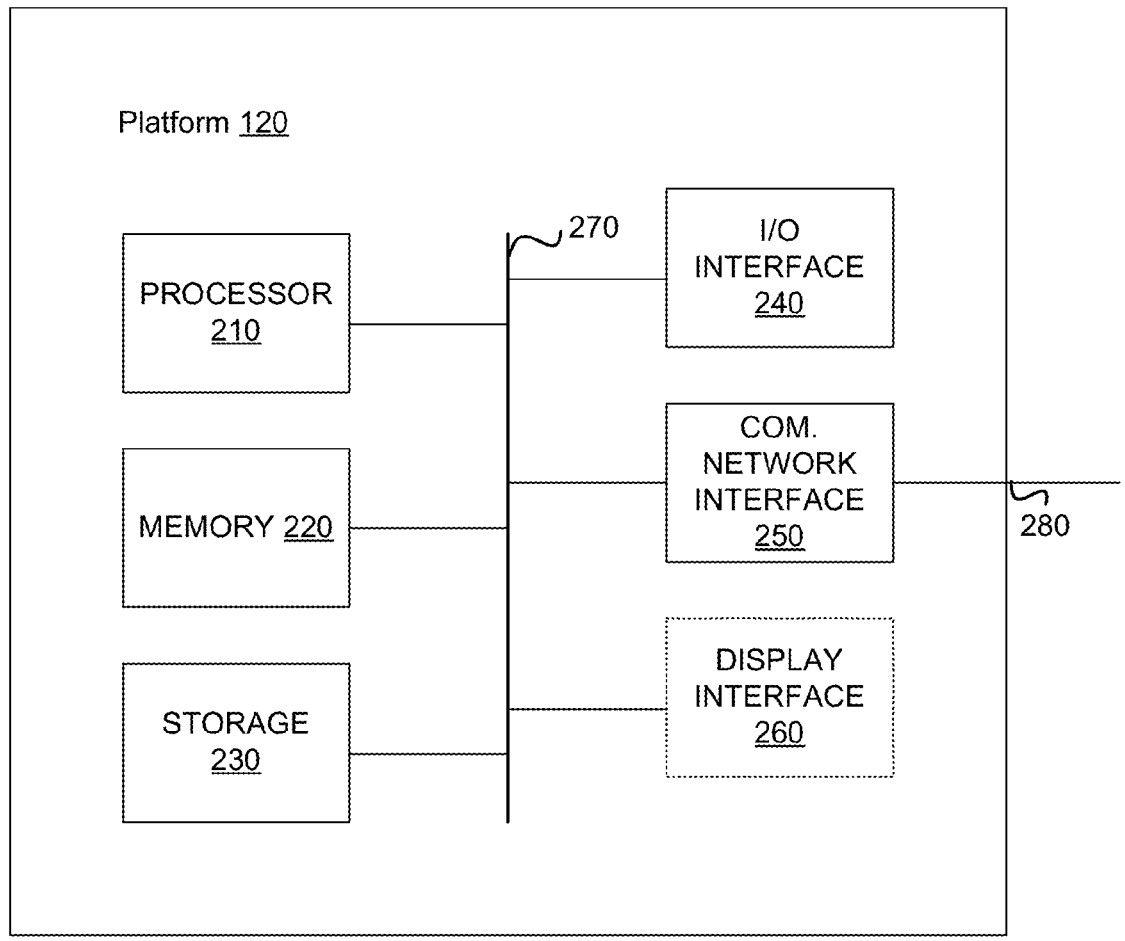
FIG. 2 is a schematic illustration of several exemplary components of a platform, according to certain embodiments.

FIG. 2 is a schematic illustration of several exemplary components of a platform, according to certain embodiments. A platform may comprise hardware and software that operate to deliver services according to various aspects. In exemplary embodiments, platform 120 includes a variety of hardware components, including processor 210, memory 220, storage 230, input/output (I/O) interface 240, communication network interface 250, and display interface 260. These components may be generally connected via a system bus 270. Platform 120 may communicate (e.g., with network 110) via communication bus 280. In some embodiments, platform 120 includes a video card and/or display device (not shown).

Processor 210 may be configured to execute instructions. In some embodiments, processor 210 comprises integrated circuits or any processor capable of processing the executable instructions. In some embodiments, processor 210 may include a cache, a multi-core processor, a video processor, and/or other processors.

Memory 220 may be any memory configured to store data. An example of memory 220 includes a computer readable storage medium, which may include any medium configured to store executable instructions. For example, the memory system 220 may include, but is not limited to, storage devices such as RAM, ROM, MRAM, flash memory, and/or memory.

Certain configurations include storage 230 as part of platform 120. In other configurations, storage 230 may be implemented remotely, for example as part of a remotely located database (not shown). Storage 230 may be any storage configured to receive, store, and provide data. Storage 230 may also include computer readable non-transitory storage media such as a memory, a hard drive, an optical drive, and/or magnetic tape. Storage 230 may include a database or other data structure configured to hold and organize data. In some embodiments, platform 120 includes memory 220 in the form of RAM and storage 230 in the form of a hard drive and/or flash memory.

Input and output (I/O) may be implemented via I/O interface 240, which may include hardware and/or software to interface with various remotely located devices such as a user device 100 (FIG. 1). I/O interface 240 may interact with a local keyboard, mouse, pointer, touchscreen and the like of user device 100.

Communication network interface 250 may communicate with various user devices, and such communications may include the use of network 110 (FIG. 1). Communication network interface 250 may support serial, parallel, USB, firewire, Ethernet, and/or ATA communications. Communication network interface 250 may also support 802.11, 802.16, GSM, CDMA, EDGE and various other wireless communications protocols.

Display interface 260 may include any circuitry used to control and/or communicate with a display device, such as an LED display, an OLED display, a CRT, a plasma display, and the like. In some configurations, display interface 260 includes a video card and memory. In some configurations, a user device 100 (FIG. 1) may include a video card and graphic display, and display interface 260 may communicate with the video card of user device 100 to display information.

The functionality of various components may include the use of executable instructions, which may be stored in computer readable storage media (e.g., memory and/or storage). In some embodiments, executable instructions may be stored in memory 220 and/or storage 230. Executable instructions may be retrieved and executed by processor 210, and may include software, firmware, and/or program code. Executable instructions may be executed by the processor to perform one or more methods.

Figure 3:
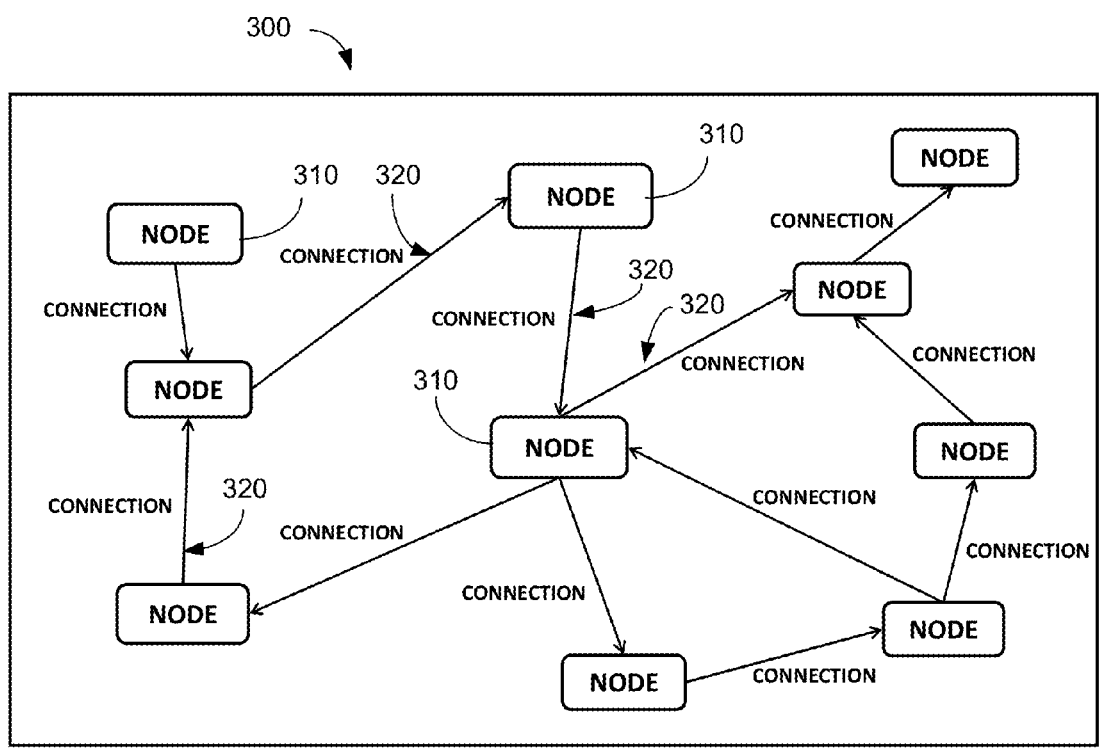
FIG. 3 illustrates a map, according to some embodiments.

FIG. 3 illustrates a map, according to some embodiments. A map may be displayed on a device (e.g., a computer, phone, PDA and the like) via the receipt of map data from platform 120. Map 300 may include a graphical representation of a plurality of nodes 310, which may be connected by one or more connections 320. A node may be a tangible data structure that typically represents an idea or thought or other intangible concept. By defining and/or constraining the data structure of the node, boundaries on the intangible idea may be enforced, thus defining the idea or thought. In some embodiments, a single node represents a single thought, and a single thought is only represented by a single node. Modifications or versions of the thought may be represented by other nodes (connected to the first node). A connection may describe the relationship between nodes. The layout of the map may be used to represent the relationship among nodes and connections.

A map may present information graphically, in a manner that facilitates conveyance of map data to a user. A device displaying the map may comprise a user interface (e.g., a touchscreen) through which a user may interact with a map (e.g., provide input on the map to system 120). Input from a user of a device may be used by platform 120 to update map data, which may then be sent to a device that updates a map using the updated map data.

Figure 4:
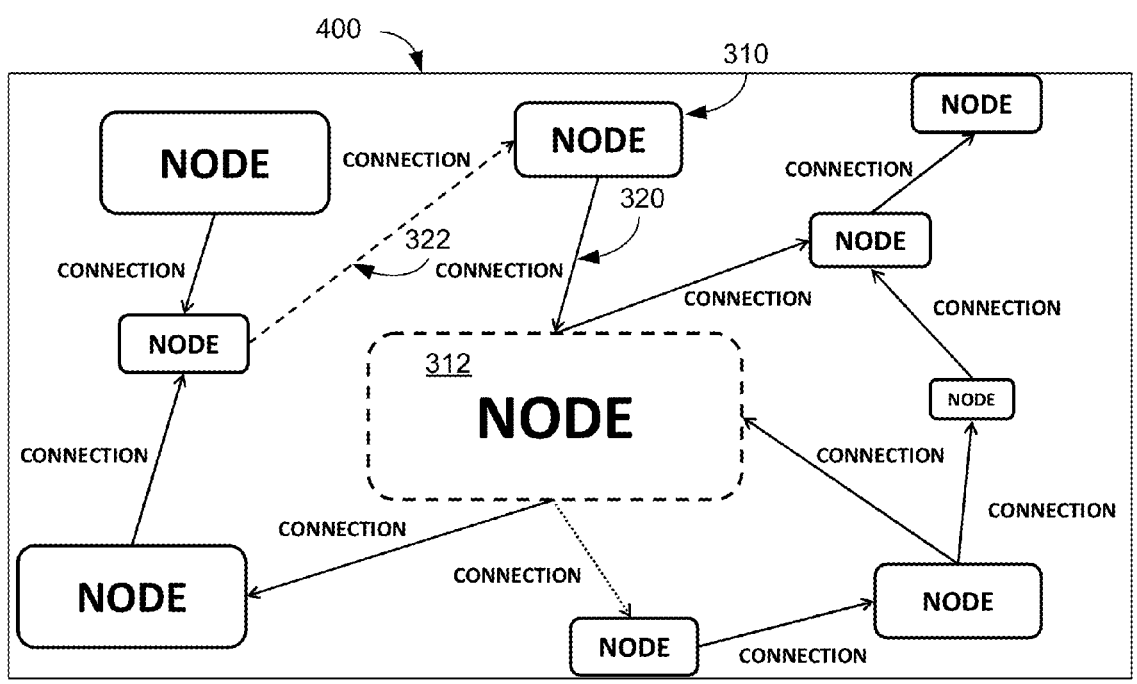
FIG. 4 illustrates a map, according to some embodiments.

FIG. 4 illustrates a map, according to some embodiments. In some embodiments, a map incorporates graphical cues associated with nodes and connections (e.g., color, size, motion, sound, line type, background, line thickness, distance) to convey prior user input regarding the nodes and connections. In exemplary FIG. 4, user input regarding a map has resulted in emphasis of node 312 as compared to node 310. This emphasis might result from a large number of users "agreeing" or "supporting" this node. To convey this emphasis, node 312 may be displayed near a center of the display area of the device, have a larger size, have a brighter color, graphically "vibrate," and the like. A connection 322 may graphically convey (e.g., via line type, thickness, shading, and the like) a relative importance as compared to another connection 320.

User input received by system 120 may be aggregated to assess feedback from users regarding a map. Exemplary input may comprise a vote (e.g., agree, disagree, neutral, share) on a connection and/or node. Input may comprise a modification request (e.g., to add a node or connection). Input may used to update a map such that emphasis (shown on the map) scales with the magnitude of user input. For example, a node and/or connection may be larger when many users agree with the node. A node or connection may be smaller when many users disagree. A node or connection may have a particular color when there are similar numbers of "agree" and "disagree" inputs. A node or connection may disappear (according to an adjustable threshold). Disappearance (e.g., via a color change to "transparent") may be used to de-emphasize less important information. By emphasizing the display of information that (according to historical input) has the greatest importance, a subsequent user's attention may be focused on the "highest priority" nodes and connections.

A map may be comprised of a plurality of sub-maps, all of which (or only a portion of which) may be displayed. A map connector may connect a first map to a second map, typically via a connection between a first node of a first map and a second node of a second map. In some cases, a previously generated map may be "applied" to or otherwise connected to a new map.

Figure 5:
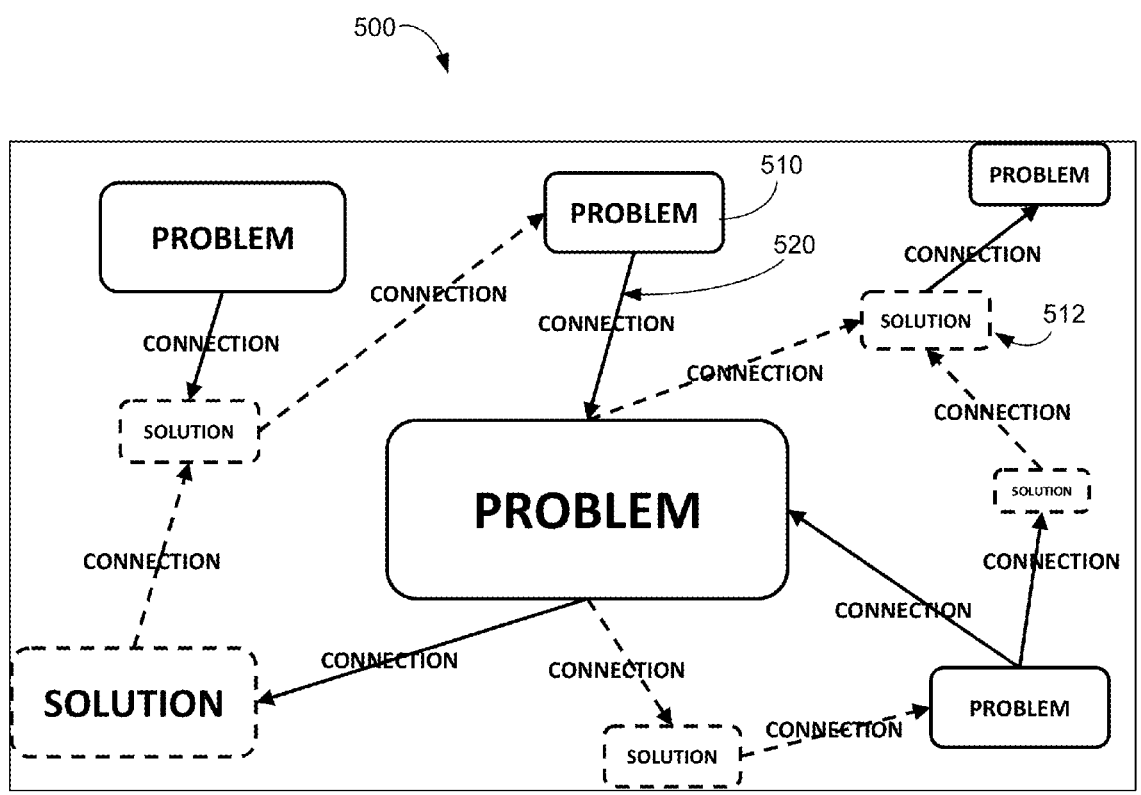
FIG. 5 illustrates a map, according to some embodiments.

FIG. 5 illustrates a map, according to some embodiments. A plurality of users (a "crowd") may share a desire to solve a complex problem. Often, the solution to a complex problem requires the solution of many interrelated sub-problems, many of which interact with each other. In some embodiments, a node may represent a problem or a solution to a problem (including a purported solution or a solution to part of a problem). A connection may represent a relationship between a problem and a solution, a problem and another problem, a solution and another solution, and the like.

In FIG. 5, map 500 comprises a plurality of problems 510 and solutions 512, represented as nodes. Connections 520 convey the relationship between the respective nodes (problems or solutions) connected by the connection. Graphical cues (e.g., size) may convey importance of various problems, solutions, and connections.

A user may provide input (e.g., a vote) on a connection or node (e.g., agreeing, disagreeing, sharing with another user, "tweeting" the contents, and the like). A user may request a modification to the map (e.g., the addition (and in some cases, deletion) of a node or connection). Aggregate user input (e.g., number of votes agreeing with a node) may be used to determine graphical cues (e.g., size) that may emphasize according to the magnitude of the input. User input may be used to modify the map. In some cases, a "resolution" control on the user device (e.g., a slider bar) may be used to control an amount of information (e.g., number of nodes and/or connections) displayed by the display device. A user may "zoom in" or "zoom out" of a map of nodes and connections, much as s/he would "zoom in" or "zoom out" of a geographical map.

Figure 6:
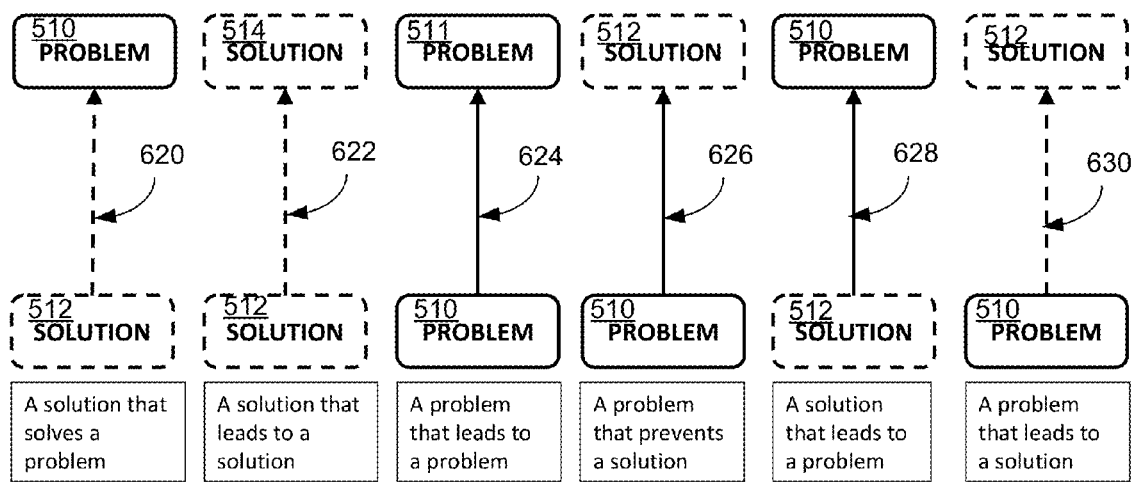
FIG. 6 illustrates various relationships between nodes, according to some embodiments.

FIG. 6 illustrates various relationships between nodes, according to some embodiments. A connection type may be quantified (e.g., as a type of input data). Users may request and/or modify connections via their input into system 120.

In FIG. 6, a node may be a problem 510 or a solution 520. Connection 620 defines a relationship conveying that solution 512 solves problem 510. Connection 622 defines a relationship conveying that solution 512 leads to (or enables) another solution 514 (e.g., a solution for one problem also works for a different problem). Connection 624 defines a relationship conveying that a first problem 510 leads to (or creates) another problem 511 (e.g., polluted water leads to fishery decline). Connection 626 defines a relationship conveying that problem 510 inhibits or prevents solution 512 (e.g., lack of roads prevents efficient distribution of medicine). Connection 628 defines a relationship conveying that solution 512 (e.g., to one problem) leads to another problem 510 (e.g., electric cars may reduce tailpipe pollution, but increase pollution coming from power plants generating electricity). Connection 630 defines a relationship conveying that problem 510 leads to a solution 512 (e.g., for certain native American tribes, lack of a written language enabled improve encryption during world war II, or "when life gives you lemons, make lemonade").

A connector or connection (not shown) may convey another relationship between nodes. For example, a first problem may be related or otherwise relevant to a second problem. This relationship may be conveyed with a relevance/related connection.

Figure 7:
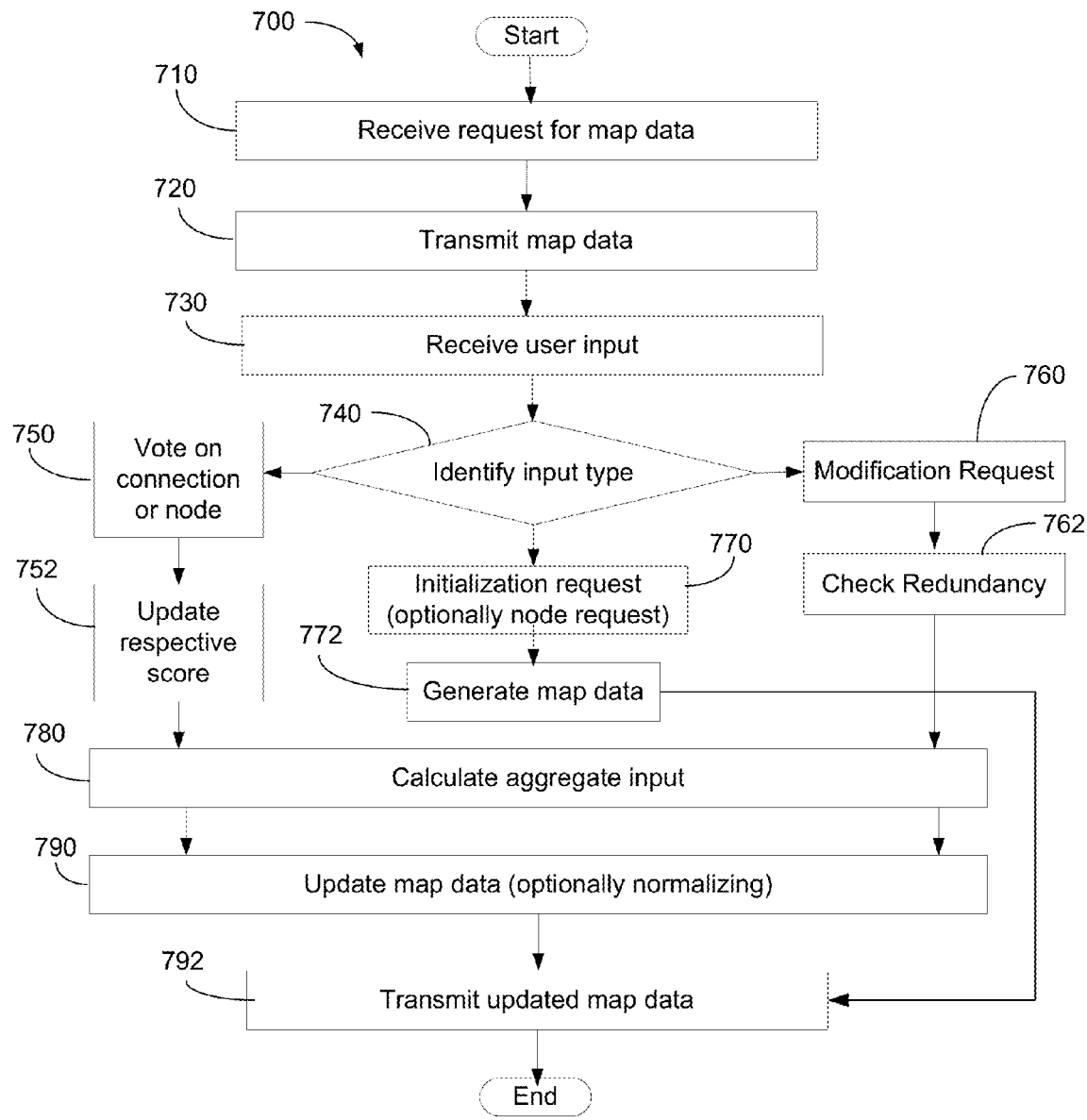
FIG. 7 illustrates a method, according to some embodiments.

FIG. 7 illustrates a method, according to some embodiments. Method 700 may be executed (e.g., by platform 120) to interact with one or more users via their respective devices. Platform 120 may receive input from and provide map data to the devices, which may display the map data as a map. The map may be dynamically updated as user input is received, incorporated into updated map data, and subsequently sent to devices. The aggregate input may be used to assign importance to various nodes and/or connections, and by extension, emphasize those nodes or connections.

In step 710, a request for map data is received (e.g., from a user device). A request may indicate that the user wishes to view a map, which may be generated by map data. Map data may comprise at least two nodes and at least one connection between two nodes. In some cases, the request may be associated with an existing map. In some cases, a map request may include an initialization request for a new map, which may include a node request for a new node (e.g., a problem to be posed), two nodes and a connection, and the like.

In step 720, map data are transmitted to the device, which may generate the map using the map data and display the map to a user. In step 730, user input (e.g., associated with the displayed map) is received via the device. Typically, user input is restricted to compact, simple data structures (e.g., 140 or fewer characters of text (e.g., ASCII), including 100 or fewer characters, or even a few Boolean variables, including a 1-10 Boolean variables), which may simplify the demarcation of a node or connection. Input may include an image, a picture, a drawing (e.g., a CAD drawing), a video, a sound, text, and the like. Input may comprise a vote on at least one of a connection and a node, and/or a modification request requesting modification to the map. In some cases (e.g., where a map has not yet been created) user input may comprise an initialization request to create a map. An input may comprise navigation data, which define a portion of a map upon with which a user is interested.

In step 740, the input type is identified. For input associated with a vote, step 750 incorporates (e.g., adds, subtracts, multiplies) that vote and its effect on its associated node or connection into the map data. A vote may include an affirmation of the connection or node, a rejection of the connection or node, a neutral position, a comment, and/or an instruction to share the connection or node (e.g., with other users, including users on other social networks).

A node and/or connection may have one or more metrics or "scores" based on its respective votes. An exemplary score may be the total number of "agree" votes minus (or divided by) the total number of "disagree" votes. A score may be normalized by dividing by a total number of votes (e.g., received for that node or connection, received for the map, and the like).

In step 752, the respective score for the node or connection is updated. Updating may comprise aggregating the input regarding the node or connection and incorporating that input into a score of the node or connection. The score may represent the aggregate opinion regarding the importance, accuracy, or other aspect of a node or connection. Different types of input may be allocated different weights (e.g., votes may be weighted with a voteweight; shares may be weighted by a shareweight; comments may be weighted by a commentweight). A score may be normalized (e.g., by the total number of times a node or connection has been displayed to users, which may be a proxy for users' opportunities to provide input). For example (using a node), a Nodescore could be calculated as follows:

Nodescore (for a node)=((#Yes votes−#No votes)/voteweight+#Shares/shareweight+#Comments/commentweight)/(# of times the node has been displayed to users). An exemplary voteweight=1; shareweight=5; commentweight=3, assigning largest weight to votes, and least weight to shares.

A certain node in each map may be set as the active node. The active node may be used as a point from which the display properties of the map are calculated. If no specific node is chosen as the active node (by the user viewing the map) the first node and/or the node having the most "yes" votes may be set as the active node. A node of the map having the most diversity (e.g., a large number of both yes and no votes) may be set as the active node.

For an input type comprising a modification request, step 760 evaluates the modification request (e.g., applying rules-based decisions to modify the map). In some cases, a modification request asks for a modification that is similar (or even identical to) an existing part of the map (e.g., asking for the creation of a solution, when the solution already exists on the map). Such redundancy may be checked in optional step 762. A modification request may be checked for redundancy (e.g., to determine if it is duplicative of a previously received modification request). A node and/or connection may be checked for redundancy. In some cases, user input may be used to determine redundancy. A user input may comprise a redundancy vote, which may indicate that a particular node or connection is duplicative of another node or connection. An aggregate vote (e.g., summing agreement and disagreement) may be used to determine redundancy. A redundant node or connection (e.g., one for which a consensus has concluded redundancy) may be removed (e.g., have color=transparent). A redundancy check may comprise receiving user input from a plurality of users, each user input comprising a redundancy vote, the redundancy vote indicating a user's opinion regarding the redundancy of a node or connection, aggregating the received user input to calculate an aggregate opinion regarding the redundancy of a first node or connection with respect to a second node or connection, and removing the first node (or add attributes such as votes or connections) to a second node) or connection when an aggregate opinion indicates that the first node or connection is duplicative of an existing node or connection.

For cases in which there is no pre-existing map, the input data may include an initialization request 770, which typically includes a request for a first node. In step 772, an initial set of map data are generated.

In step 780, aggregate input (typically from many users) is calculated. In step 790, the map data are updated to reflect the input of the users (e.g., updated scores and modification requests). In some cases, map updates include a normalization in which the input associated with a particular node or connection (within a period of time) is divided by the aggregate input associated with the entire map within the period of time (e.g., votes for a particular node/total votes for all nodes).

In step 792, updated map data are transmitted to one or more devices, which may then update their respective maps (e.g., in real time). A user interacting with the device may watch the map change as the effect of user input on the map is calculated, map data are updated, and the map is refreshed using the updated map data. Updated map data may be sent to the device providing the input (and/or other devices).

Updated map data may comprise updated graphical cues associated with various nodes or connections. For example, a size of a node or connection may be determined by a score for that node or connection (e.g., with larger scores yielding more prominent display). For example (using a node) a size of a node (within a particular map) may be calculated as follows:

Nodesize(i)=(Nodescore(i)−(minimum Nodescore of node within that map))/((Maximum Nodescore of node in that map−Minimum Nodescore of node within that map)/(total number of discrete sizes available for display in that map)). Such a calculation may provide for dynamic resizing of nodes or connections with each update.

A map may comprise a graphical representation in which the user input associated with a node or connection is conveyed graphically (including audibly, with motion, and the like). A color of a node or connection may identify a type of node or connection and/or a relationship between first and second nodes. A size of a node or connection (including a line type) may represent a magnitude of the aggregate input associated therewith. A distance between nodes may represent a relevance or impact of one node upon the other (e.g., with correlated nodes displayed close to each other).

A map may be updated dynamically (e.g., over a sequence of periods of time). An aggregate input may be calculated during a window of time the map data may be updated accordingly, transmitted to a device, and the device may be instructed to update the map. User input received during a subsequent period of time may be similarly processed, such that the graphical features of the map continually evolve according to the previously received user input.

In some cases, a map may comprise an action request. An action request may be a request that a user take action outside and/or beyond his or her interaction with the map. For example, consider the problem "what is the best charity to donate money to?" A map directed toward answering this problem may evolve (with user input) to include a node comprising an action request such as "donate to [this charity] now." The action request may be based on aggregate user input. For example, the donation might be made to the charity voted by the user base to be most worthy of donation, or a portion of the aggregate donation may be distributed to each charity receiving a certain number of votes (e.g., in an amount correlated with the magnitude of number of votes).

Revisions (e.g., at a date of modification) of map data may be stored. In some cases, map data may be at least partially "reverted" to incorporate prior map data by incorporating stored map data from a prior revision. User input may include a request for a particular revision number, and updating the map data may comprise selecting the portion of the map data associated with the first revision number.

Figure 8:
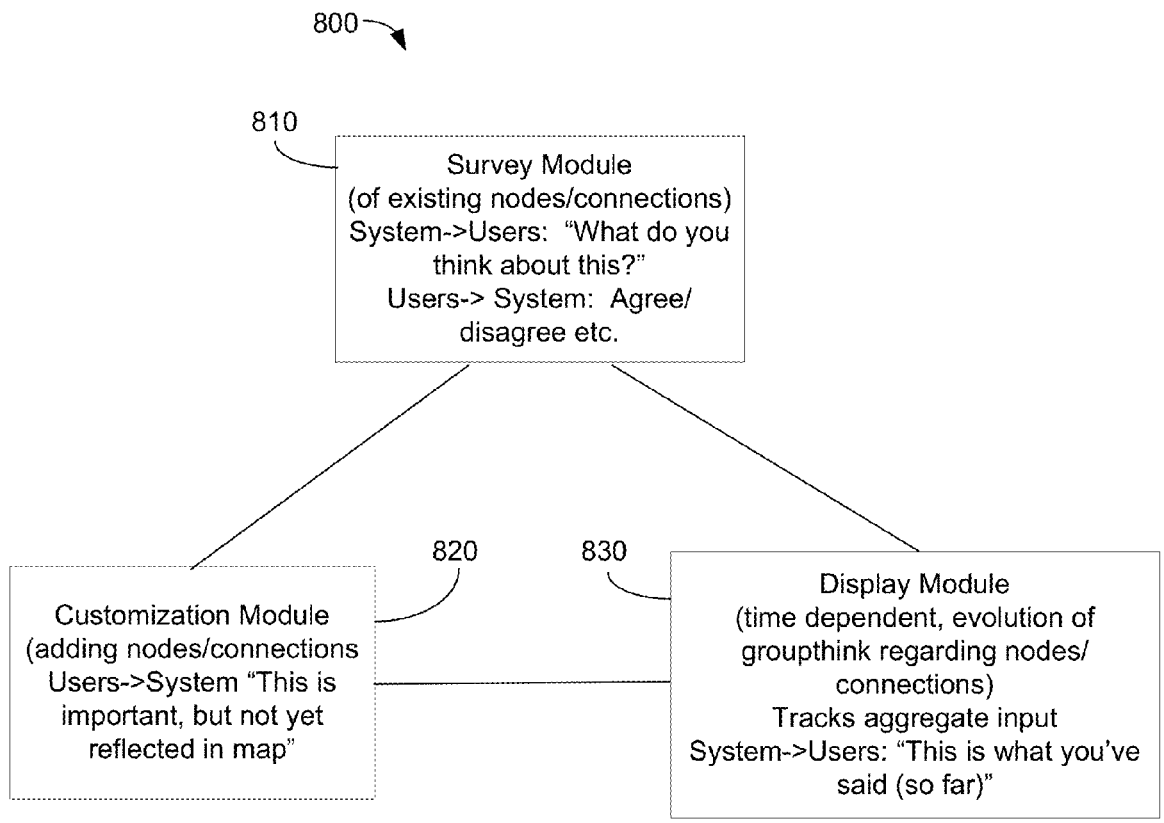
FIG. 8 illustrates a representation of an exemplary architecture, according to some embodiments.

FIG. 8 illustrates a representation of an exemplary architecture, according to some embodiments. Architecture 800, which may be implemented as part of platform 120, may comprise one or more modules, each providing computer-implemented functionality. Platform 120 may comprise instructions configured to receive user input, identify a type of that input, and direct the input to one or more modules for further processing.

Exemplary architecture 800 comprises a survey module 810, a customization module 820, and a display module 830.

Survey module 810 may provide "survey" functionality (e.g., associated with receiving votes), and may canvass or otherwise query users for input (e.g., on existing nodes and/or connections), providing a mechanism through which users may vote on aspects of the map. Survey module 810 may process (e.g., aggregate) user input directed toward existing nodes (e.g., votes) and may store data in (and retrieve data from) a database (e.g., using MySQL). Customization module 820 may communicate with survey module 810 and provide for customization of a map (e.g., via user input providing a modification request). Customization module 820 may receive a modification request, assess the modification request (e.g., check redundancy using survey module 810) and modify the map according to the modification request. Customization module 820 may communicate this modification to survey module 810.

Display module 830 may communicate with both survey module 810 and customization module 820. Display module 830 may generate time-dependent display instructions (e.g., in Flash, Java, HTML5 and the like) for use by a display device. These instructions may display a map (e.g., dynamically updated over time) and convey information between a user device and survey module 810 and/or customization module 820. Dynamic updating of a map may include an adjustable window of time over which user input is aggregated (e.g., since creation of the map, in the past months, in the past few days, in the past few hours, within the past few minutes, or even within the past second), which may convey the evolution of aggregate user input in real time. Display module 830 may convey to users "this is what you're saying" or "this is what you've said [so far, in this period of time, and the like]."

FIGS. 9*a-g* illustrate representative screenshots, according to some embodiments. FIGS. 9*a-g* represent a construction of a map comprising nodes that may be problems or solutions, with various connections connecting the nodes.

Figure 9A:
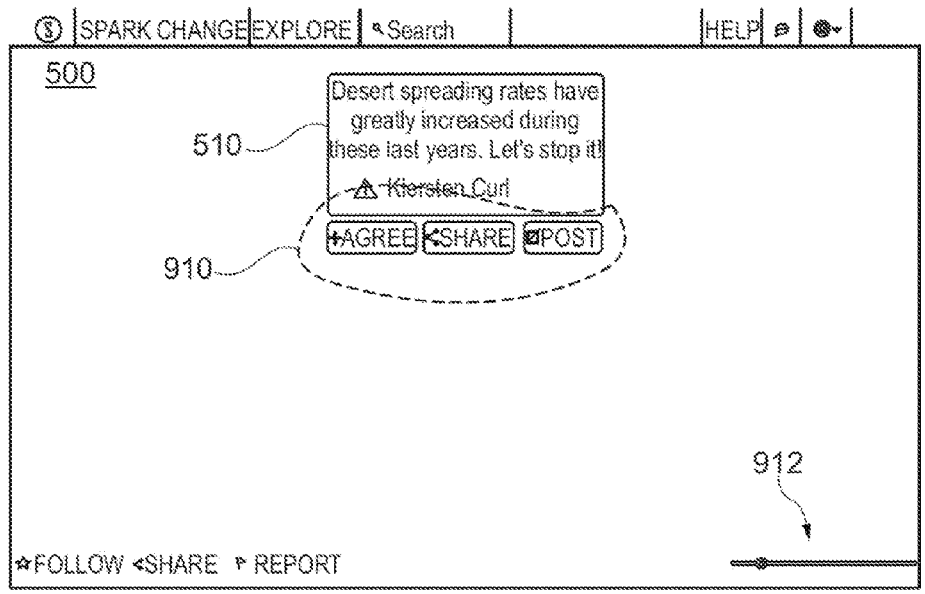
FIGS. 9a-g illustrate representative screenshots, according to some embodiments.

FIG. 9*a* illustrates an "early stage" form of a map 500 having one problem 510 and a user input area 910, which may receive input regarding the problem (e.g., agree/disagree, share, post a comment). Slider bar 912 may allow a user to zoom in/out on the map.

Figure 9B:
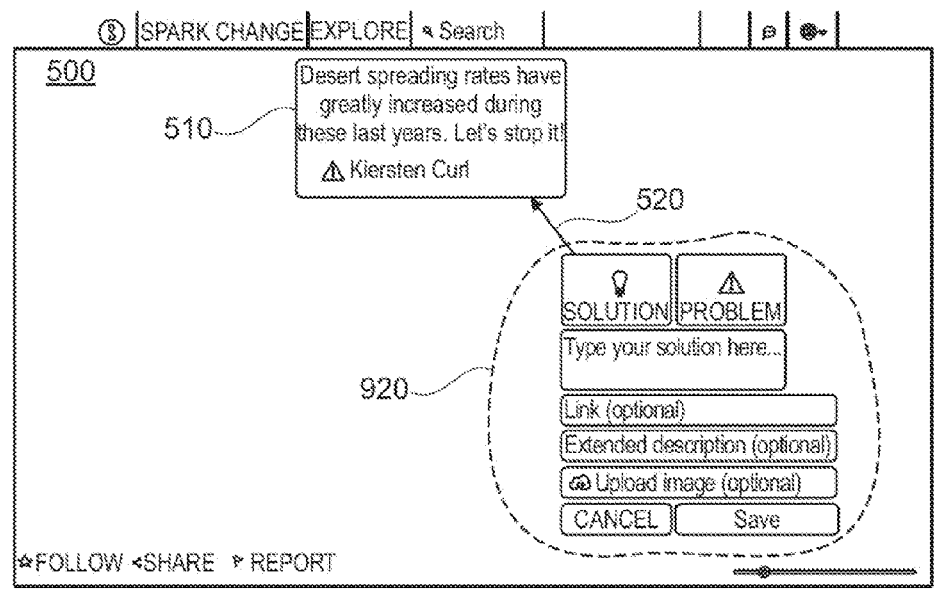

FIG. 9*b* shows map 500 after a user has created a connection 910, and (at this stage) displays a user input area 920 within which a user may define a new node (e.g., a problem or solution) to be connected to problem 510 via connection 520.

Figure 9C:
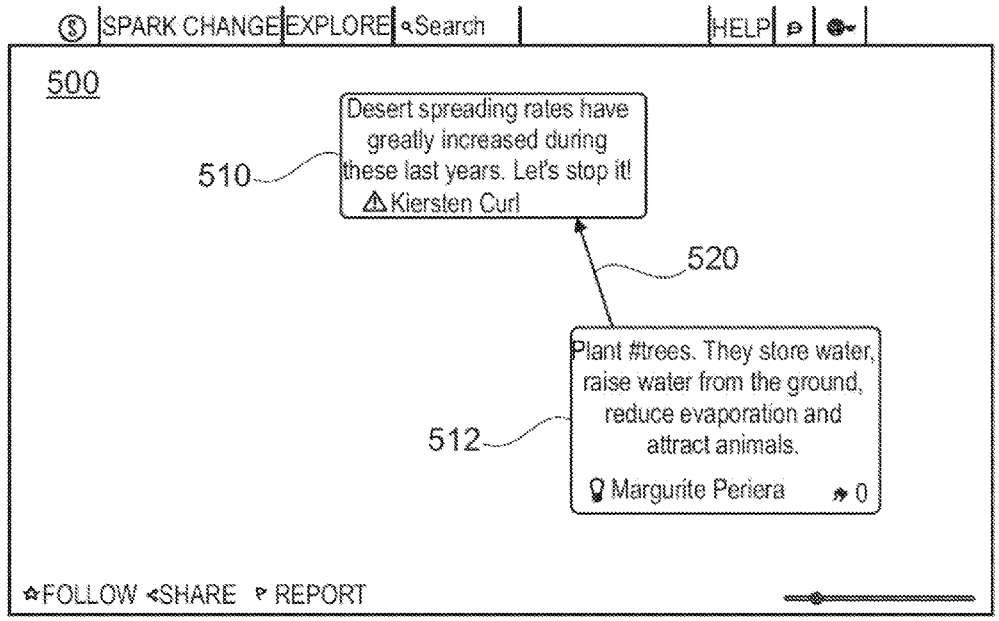

FIG. 9*c* illustrates that this new node is a proposed solution 512 to problem 510, connected to problem 510 via connection 520.

Figure 9D:
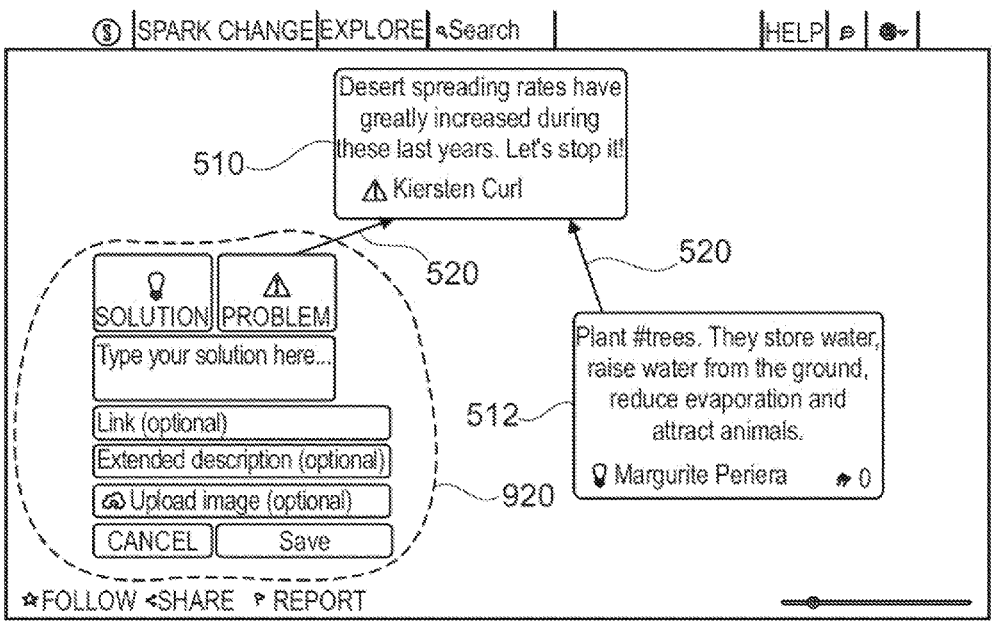

FIG. 9*d* illustrates a subsequent map 500, in which a user (e.g., a different user) uses another input area 920 to define yet another node (which, in this case, will be connected to the first problem 510 via another connection 520).

Figure 9E:
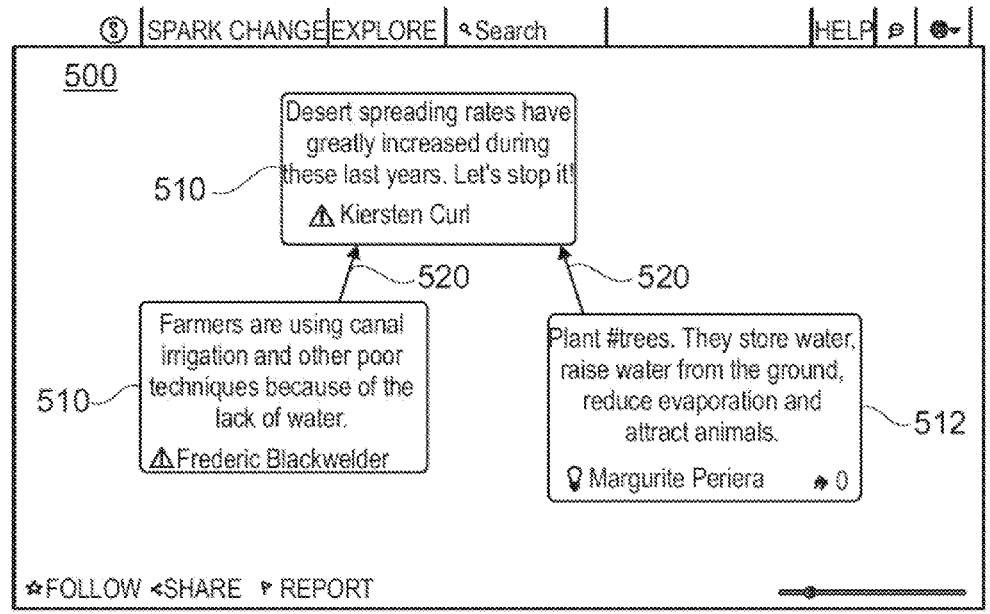

FIG. 9*e* illustrates map 500 after this second node 510 has been created.

Figure 9F:
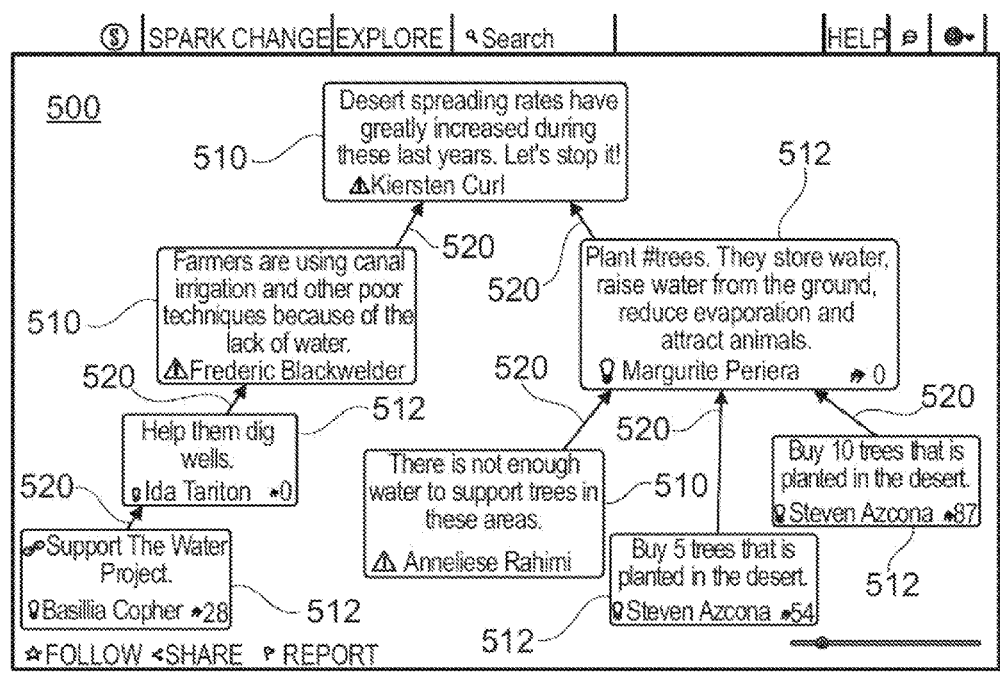

FIG. 9*f* illustrates map 500 after additional user input, illustrating a plurality of problems and nodes connected by various connections.

Figure 9G:
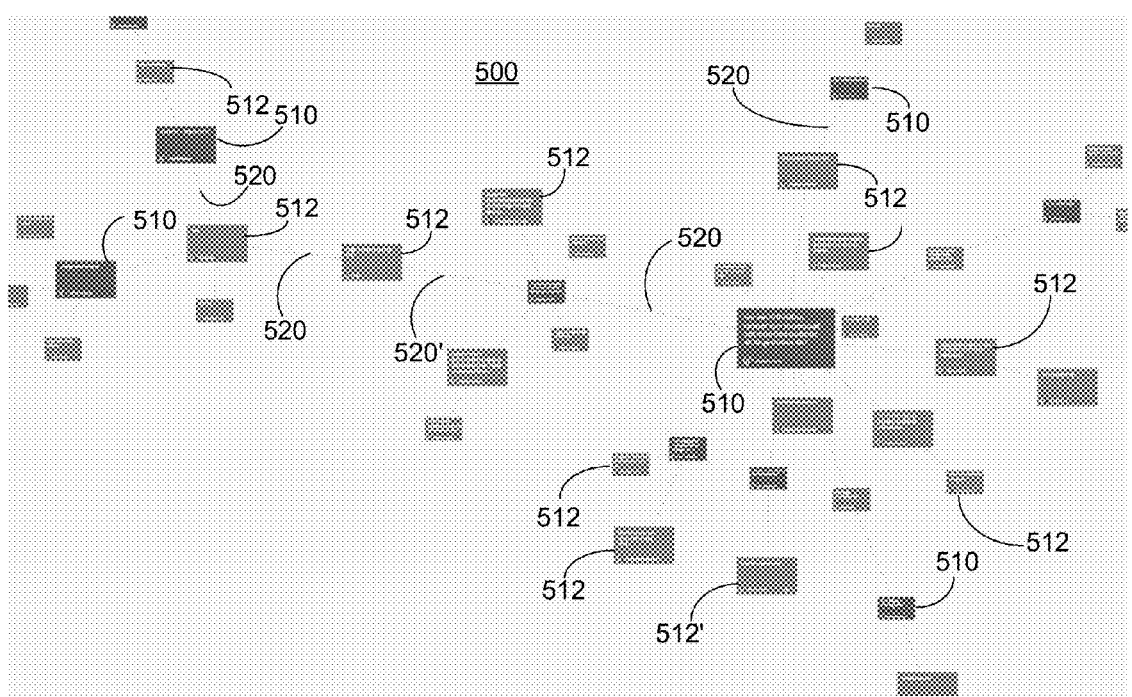

FIG. 9*g* illustrates a small portion of a subsequent version of map 500, in which even more nodes and connections have been created. FIG. 9*g* also illustrates different sized nodes, in which the size of the problem or solution depends on the number of affirming votes for that problem or solution.

FIG. 9*g* illustrates an exemplary map connection 520'. FIG. 9*g* also illustrates an exemplary prompt for action 512' (in this case, associated with a solution). A prompt for action may prompt a user to take action (e.g., donate funds to a charity).

In an implementation, platform 120 may be used to receive input (e.g., from a plurality of users) regarding nodes and/or connections between nodes. This input may be aggregated, and the aggregate input may be displayed in a manner that emphasizes the magnitude of the user input (e.g., nodes having greater importance are displayed more prominently than those having lesser importance). Such emphasis (graphically displayed) may direct users toward nodes and connections that have been determined (by prior user input) to have high priorities. As such, platform 120 may be used to allocate resources (by attracting user attention) according to nodes or connections deemed most important (according to aggregate input from the users). As such, an organization structure (e.g., to allocate resources) may be dynamically created by the users themselves (via their input).

User input may be used to attract user attention, which may enhance resource allocation (e.g., user effort) to solve problems. A problem may be broken down into nodes. A node may include a problem (e.g., a sub problem). A node may include a solution (e.g., a sub solution). A connection between nodes may identify the relationship between the nodes connected by the connection. For example, a solution may solve a problem. A solution may lead to another solution (e.g., a solution to a first problem may enable a solution to a second problem). A solution may lead to a problem (e.g., a solution to one problem may cause another problem). A problem may lead to a solution. A problem may prevent a solution. A problem may lead to a solution.

A node may include a standardized input and/or output format, which may be revised. A standardized format may enable the automated characterization of the node (e.g., whether it is a problem or a solution).

A connection may connect two or more nodes. A connection may include a standardized data format, which may be integrated with the data format associated with the nodes connected by the connection. A connection may be subject to a framework of rules that govern the interactions among the nodes.

A platform may be configured to implement a map. A map may represent the connections and nodes. A map may be displayed (e.g., to a user of a user device). A map may be a representation of the nodes and their associated connections.

Input may include a format, which may identify the input as a node and/or connection. Input may include a "vote" that assigns a level of interest to a node or connection. A map may reflect an aggregate level of interest in the various nodes and connections. Votes received from a plurality of user devices may be used to revise a map, such that the aggregate interest in various nodes and connections is updated dynamically.

Aggregate interest may be used to allocate effort. In some cases, a node or connection having increased interest is "pushed" to users for additional input at a higher rate than a node or connection having decreased interest. The aggregate effort of the users may be continually re-allocated toward those nodes and connections having the highest interest by prioritizing interaction between the users and the "high interest" nodes and connections.

A map may be continually revised (e.g., iterated) to update nodes and/or connections. Connections may be broken and/or established. Nodes and connections may be prioritized or de-prioritized. In some cases, an action associated with updating a map may be initiated after having received an aggregate amount (e.g., a number, a percentage) of "votes" from various users via their user devices (e.g., as input).

A representation of historical aggregate input may indicate to a user (e.g., graphically) the aggregate importance of various nodes and connections. Subsequent work (e.g., toward solving a problem) may be allocated based on prior input (e.g., votes regarding agreement/disagreement with various nodes and/or connections). By allocating subsequent work based on prior aggregate input, a plurality of users (providing the aggregate input) may influence the display of subsequent maps, and thus influence the prioritization of tasks for subsequent effort.

User input may be used to dynamically redraw the map in a manner that improves the ability of the map to demarcate a path from the problem to the solution. Iterative analysis of user input may be used to improve map accuracy, which may be used to direct user effort (e.g., toward improving map accuracy). As such, user effort may be allocated efficiently (e.g., more effort directed toward parts of the map having greater inaccuracy or more route choices or more difficult solutions). Structured and/or standardized input/output may be combined with automated optimization routines to dynamically deploy resources (e.g., user effort). Resources may be redeployed (e.g., the map may be improved) until aggregate user input (e.g., consensus) reflects that the map shows a path from the problem to a solution.

An automated allocation and iterative redeployment of crowdsourced resources may minimize an aggregate effort (e.g., by the users) needed to perform a task (e.g., solve a problem). Redundant effort may be avoided. Effort devoted to "non critical" or "less important" sub tasks may be reduced, and effort devoted toward "more important" tasks may be increased. The aggregate determination of "more" or "less" important may change (e.g., according to user input).

A map may represent a plurality of paths to "travel" from a problem to a solution in a "knowledge space" (as opposed to a physical space). Input from many users may be used to dynamically "redraw" a map in a manner that improves the clarity with which the map shows a path from a solution to a problem. To use a physical analogy, many climbers may wish to climb to the top of the same mountain, and they may all start at different points at the bottom of the mountain. As each climber proceeds, his/her input may influence the paths of the others (e.g., "this way is easy" or "rocks are falling over here"). A dynamically adjusted map (of all the users' paths) may receive the aggregate input from all the climbers and identify the "easiest" combination of paths, and so the map may "iterate" toward a representation that identifies the easiest route up the mountain. As different climbers abandon the difficult paths and adopt the easy paths, the aggregate ascent of the mountain by all climbers may improve.

An aggregate effort of a plurality of users may be efficiently deployed toward a task by allocating resources according to an aggregate distribution of input (e.g., votes) from the users. An interaction map may represent a network comprising a plurality of nodes connected by connections. A node may include a problem; a node may include a solution. A connection may describe a relationship between at least two nodes. User input may be used to dynamically adjust network in a manner that improves the map (e.g., increases consensus that the map is correct). As consensus regarding the accuracy of the map improves, the map may be used to direct further efforts of the users.

Interaction among users may be formalized with the use of standardized input and output data. Standardized data may be used to generate quantified measures of input (e.g., agreement, disagreement, validation, aggregate interest) in various aspects of the network. The aggregate interest may be used to dynamically revise the network (and by extension, the map), such that the interaction among users "progresses" over time. The revised map may yield a revised resource allocation that directs users toward higher value efforts. After sufficient iterations, a map may arrive at a solution to a problem via the organized effort of a plurality of resources (e.g., users). Using the "search party" analogy, user input may be used to prioritize areas for search (e.g., already searched, quickly searched, thoroughly searched). Aggregate user input may be used to redeploy users from areas "already searched" to areas that have not been searched, or to areas difficult to search.

A map may evolve over time, the map may evolve or "progress" according to user input (e.g., interaction between users and platform 120) and so may be described as a "progressive interaction map." A map may be revised and updated dynamically as each user provides input. For a large number of users, this revision may occur substantially continuously, and a graphical display of the map may continuously reflect the revised map and/or analysis of the map.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
   receiving a request for map data from a first device, the map data usable by the first device to generate a map comprising at least two nodes and at least one connection between two nodes, the connection defining a relationship between the two nodes;
   transmitting the requested map data to the first device;
   receiving an input from the first device, the input comprising at least one of:
   a vote on at least one of a connection and a node; and
   a modification request requesting a modification to the map;
   updating the map data pursuant to the received input; and
   transmitting the updated map data to a second device.

2. The method of claim 1, wherein the map comprises a graphical representation in which at least one of:
   a shape identifies a type of node, a type of connection, or a relationship between first and second nodes;
   an icon associated with a node or connection identifies a type of node, a type of connection, or a relationship between first and second nodes;
   a color of a node or connection identifies a type of node, a type of connection, or a relationship between first and second nodes;
   a size of a node or connection represents a magnitude of the aggregate input associated with the node or connection;
   a line type of a node or connection conveys a magnitude of the aggregate input about that node or connection; and
   a distance between two connected nodes represents a number of votes regarding the connection between the connected nodes.

3. The method of claim 1, wherein the first device and the second device are different devices.

4. The method of claim 1, wherein a node comprises:
   a problem to be solved; or
   a solution that at least partially solves a problem.

5. The method of claim 1, wherein a first node includes a problem or a solution, a second node includes a problem or a solution, and a connection between the first and second nodes defines a relationship between the first and second nodes, the relationship comprising at least one of:
   a solution that solves a problem;
   a first solution that leads to a second solution;
   a first problem that leads to a second problem;

a problem that inhibits or prevents a solution;
a solution that leads to a problem;
a problem that leads to a solution; and
a relevance of the first node to the second node.

6. The method of claim 1, wherein updating the map data comprises calculating an aggregate input, the aggregate input comprising the received inputs from a plurality of devices over a period of time, and the updated map data incorporates the aggregate input.

7. The method of claim 6, wherein calculating the aggregate input comprises normalizing the aggregate input.

8. The method of claim 6, wherein the map comprises a graphical representation displayed by the display device, the graphical representation emphasizing the nodes and connections according to a magnitude of the aggregate input received for those respective nodes or connections.

9. The method of claim 8, further comprising, for a sequence of periods of time:
calculating the aggregate input over each period of time;
updating the map data for each period of time;
transmitting the updated map data for each period of time; and
instructing the second device to update the map over time according to the updated map data associated with each period of time.

10. The method of claim 1, wherein the updated map data comprises an action request, the action request prompting an action by a user of the device receiving the action request.

11. The method of claim 1, wherein the vote comprises at least one of:
an affirmation of the connection or node;
a rejection of the connection or node;
a neutral position regarding the connection or node;
a comment on the connection or node; and
an instruction to share the connection or node with another user.

12. The method of claim 1, wherein:
a first node includes a problem or a solution, a second node includes a problem or a solution, and a connection between the first and second nodes defines a relationship between the first and second nodes, the relationship comprising at least one of:
a solution that solves a problem;
a first solution that leads to a second solution;
a first problem that leads to a second problem;
a problem that inhibits or prevents a solution;
a solution that leads to a problem;
a problem that leads to a solution; and
a relevance of the first node to the second node
receiving a request for map data comprises receiving a plurality of requests from a plurality of devices;
receiving an input comprises receiving a vote on a connection or node from at least two different devices devices;
receiving an input further comprises receiving at least one modification request;
updating the map data comprises:
calculating an aggregate input comprising the received votes;
modifying a size of at least one of a node and a connection according to the aggregate input; and
transmitting the updated map data comprises transmitting the updated map data to the plurality of devices.

13. The method of claim 1, further comprising:
determining that the map request includes an initialization request for a new map and a node request for at least one new node; and
updating the map data comprises creating the map data, the created map data comprising the new node.

14. The method of claim 1, further comprising performing a redundancy check on the received input to determine if a modification request is substantially similar to a previously received modification request or requests a node or connection substantially similar to an existing node or connection.

15. The method of claim 1, further comprising performing a redundancy check comprising:
receiving user input from a plurality of users, each user input comprising a redundancy vote, the redundancy vote indicating a user's opinion regarding the redundancy of a node or connection;
aggregating the received user input to calculate an aggregate opinion regarding the redundancy of a first node or connection with respect to a second node or connection; and
removing the first node or connection when an aggregate opinion indicates that the first node or connection is duplicative of an existing node or connection.

16. The method of claim 1, wherein the input is restricted to 100 or fewer characters of ASCII.

17. The method of claim 1, wherein the input comprises between 1 and 10 boolean variables.

18. The method of claim 1, further comprising:
storing at least a portion of the map data and a first revision number prior to updating the map data; and
storing at least a portion of the updated map data with a second revision number after updating the map data.

19. The method of claim 18, wherein the input includes a request for the first revision number, and updating the map data comprises selecting the portion of the map data associated with the first revision number.

20. The method of claim 1, wherein the modification request comprises a request for a connection comprising a map connector connecting a first node on a first map to a second node on a second map.

21. A system comprising:
a processor, a memory, and a computer readable, non-transitory storage medium having embodied thereon instructions executable by the processor to perform a method comprising:
receiving a request for map data from a first device, the map data usable by the first device to generate a map comprising at least two nodes and at least one connection between two nodes, the connection defining a relationship between the two nodes;
transmitting the requested map data to the first device;
receiving an input from the first device, the input comprising at least one of:
a vote on at least one of a connection and a node; and
a modification request requesting a modification to the map;
updating the map data pursuant to the received input; and
transmitting the updated map data to a second device.

* * * * *